United States Patent
Verdier

[15] 3,674,080
[45] July 4, 1972

[54] WHEEL FOR HIGH-SPEED CORNERING

[72] Inventor: Henri Verdier, Beauregard-l'Eveque, France

[73] Assignee: Compagnie Generale Des Etablissements Michelin raison Sociale Michelin & Cie, Clermont-Ferrand (Puy-de-Dome), France

[22] Filed: Feb. 11, 1970

[21] Appl. No.: 10,563

[30] Foreign Application Priority Data

Feb. 19, 1969 France...................................6904236

[52] U.S. Cl..............................152/375, 152/378, 152/386
[51] Int. Cl.......................................B60c 5/00, B60b 21/10
[58] Field of Search...............152/158, 375, 78, 77, 84, 396, 152/398; 301/38 R, 38 S

[56] References Cited

UNITED STATES PATENTS

| | | | |
|---|---|---|---|
| 3,229,744 | 1/1966 | Bradley | 152/398 |
| 3,212,548 | 10/1965 | Drazin | 152/158 |
| 3,426,821 | 2/1969 | Boileau | 152/158 |

FOREIGN PATENTS OR APPLICATIONS

| | | | |
|---|---|---|---|
| 180,495 | 5/1954 | Austria | 152/375 |

Primary Examiner—James B. Marbert
Assistant Examiner—D. W. Keen
Attorney—Brumbaugh, Graves, Donohue & Raymond

[57] ABSTRACT

A wheel rim for an automotive vehicle is formed with an annular element upstanding from it and surrounding it. The annular element has a maximum diameter at least as great as the diameter of the bead seat and no greater than the diameter of the rim flange and is positioned to engage the inner surface of the outer bead of a tubeless tire when the tire is deformed as in high-speed cornering. It thus supports the bead and prevents unwedging thereof and consequent loss of inflation air.

6 Claims, 4 Drawing Figures

PATENTED JUL 4 1972

3,674,080

INVENTOR
HENRI VERDIER
BY
Bumbaugh, Graves, Donohue & Raymond
his ATTORNEYS

3,674,080

WHEEL FOR HIGH-SPEED CORNERING

BACKGROUND OF THE INVENTION

This present invention relates to wheels and rims of automotive vehicles and, more particularly, to wheels and rims that are to be equipped with tires of the tubeless kind.

When a vehicle such as an automobile travels through a sharp curve at a high speed the outer sidewalls of the tires travelling on the outer bend undergo considerable flexion towards the inside of the bend. This results in a considerable pull on the outer beads of the tires.

In the case of the tubeless tire, the retention of the inflation air is dependent on the tightness of the tire beads on the rim. A tubeless tire subjected to hard cornering may lose part of the inflation air because the beads do not remain properly applied to the rim. This is called an "unwedging" of the beads.

Thus, the simultaneous application of transverse stresses and high overloads on the outer tires, produced in turns, may lead to an unwedging of the bead and consequently to a loss of pressure. The tires that are on the outside of the turn undergo considerable deformation displacing their tread towards the inside of the turn, causing the bending of their outer sidewalls towards the inside of the rim and subjecting the outer beads to a pull tending to remove them from the rim.

Ever since the introduction of tubeless tires on the market, wheel manufacturers have tried to eliminate the unwedging of the bead and have proposed various solutions. These most frequently consisted in choosing a suitable profile of the outer bead seat, for example, in extending such seat in the form of a countersloping edge in accordance with U.S. Pat. No. 3,405,755.

The conventional expedients are not absolutely effective and only diminish the risk of unwedging without eliminating it.

SUMMARY OF THE INVENTION

An object of the invention is to remedy the deficiencies of conventional wheels noted above. In particular, an object of the invention is to provide a wheel for use with a tubeless tire that prevents unwedging of the tire, even under the severest conditions.

The wheel in accordance with the invention comprises a rim formed with a rim base and, on either side thereof, a bead seat ending in a rim flange. The rim is characterized in that it includes an annular element that surrounds the bottom of the rim and is upstanding from the rim base and has a maximum diameter of a magnitude between that of the bead seat and that of the flange of the rim, so as to form an interior supporting edge for the outer bead of the tire.

The invention is applicable specifically to rims of the well base kind, in which case the annular element in accordance with the invention is placed axially at a distance from the lateral wall connecting the well base with the outer bead seat such that, during mounting of the tire on the rim, the outer bead inserts itself between the annular element and the lateral wall.

Preferably, the annular element in accordance with the invention, in the part of its diameter exceeding the diameter of the bead seat, is roughly parallel to the extremity of the rim flange. It is also preferable that the diameter of the extremity of the annular element be larger than the mean diameter of the tire bead wire or any other reinforcement strengthening the bead.

It is advisable that the tire not anywhere touch the circular supporting edge constituted by the extremity of the annular element in accordance with the invention while the vehicle moves under normal conditions. However, in a curve taken abruptly, the bead of the outer sidewall of the outer tire comes to rest on the extremity of the annular element in accordance with the invention. In general, the line of support is situated approximately at the height of the line of connection of the bead with the sidewall: i.e., at the place where, seen in meridian section, the bead starts to become thinner. Thus, the bead proper is held between the flange and the seat of the rim, on the one hand, and the supporting edge of the ring-shaped element, on the other hand. It cannot become unwedged or slip. The driver at the wheel very clearly feels the coming to rest of the sidewall on the upper extremity of the ring-shaped element.

BRIEF DESCRIPTION OF THE DRAWING

An understanding of additional aspects of the invention may be gained from a consideration of the following detailed description of preferred embodiments thereof, in conjunction with the appended figures of the drawing, wherein.

DESCRIPTION OF THE PREFERRED EMBODIMENTS

Figure 1:
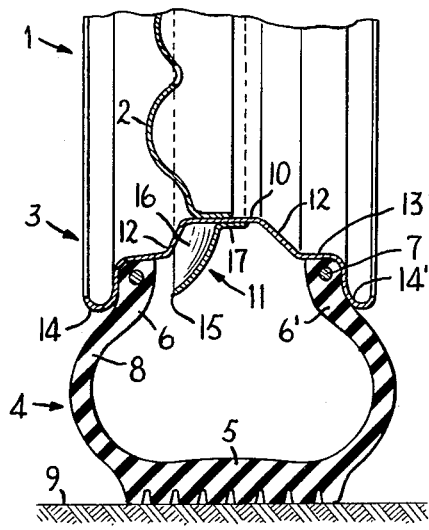
FIG. 1 is a radial section, perpendicular to the ground, of a rim in accordance with the invention equipped with a tubeless tire and rolling in a straight line under normal load.
Figure 2:
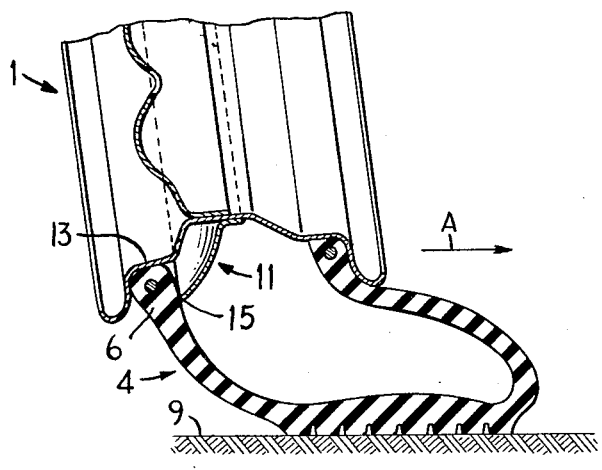
FIG. 2 is a view similar to FIG. 1 but showing the tire subjected to the lateral thrust generated in a sharp turn.

Figs. 1 and 2 show a wheel 1 comprising a disk 2 (partially shown) integral with a rim 3 on which is mounted a tire 4. The beads 6 and 6' of the tire 4 are each reinforced by a tire bead wire 7 and merge into sidewalls 8 that are connected to the crown 5 in contact with the ground 9.

The rim 3 comprises a well base 10 surrounded by an annular element 11 in accordance with the invention. This base 10 is prolonged on either side by a conical hoop 12 connected with the bead seat 13 which in turn ends in a rim flange 14 (the flange on the outside of the vehicle) or 14' (the flange on the inside of the vehicle). The flanges 14 and 14' have the shape of a hook.

The annular element 11 is fixed to the bottom of the rim 10 along a cylindrical portion and comprises a portion projecting radially and axially in the direction of the outer rim flange 14. It ends in a rounded portion 15.

In FIG. 2, the wheel 1 is inclined, as is the vehicle (not shown), towards the outside of the bend. FIG. 2 thus shows the vehicle moving into or out of the plane of the figure and making a turn in the direction indicated by an arrow A. The tire 4 is greatly deflected and its tread is considerably displaced on the ground 9 towards the inside of the turn, again as indicated by the arrow A. A very high pull on the outer bead 6 is the result. Approximately at the place where it starts to become thinner to form the sidewall, the outer bead 6 comes to rest on the supporting edge 15 of the annular element 11. Consequently, the outer bead 6 cannot become unwedged from its seat 13.

A tubeless tire is mounted on a rim in accordance with the invention over the outer rim flange 14. The rim flange 14 and the supporting edge 15 of the annular element 11 are cleared past the inner bead 6', maneuvering the rim base 10 in the customary manner. Thereafter, the outer bead 6 is slipped over the outer rim channel 14 with the help of the assembly groove 16 provided in accordance with the invention between the conical hoop 12 and the annular element 11. The tire fitted on in this manner is then inflated.

In case the axial width of the assembly groove 16 is insufficient for fitting on the valve, an opening or space of suitable dimensions can be provided in the annular element 11.

The annular element 11 shown in FIGS. 1 and 2 is fixed on the base 10 of the rim 3 by means of welds on both sides of the cylindrical base flange 17. Another simple and economical means of fastening may be the assembly in one operation of the wheel disc 2, the rim 3 and the ring-shaped element 11 by spot welding.

Figure 3:
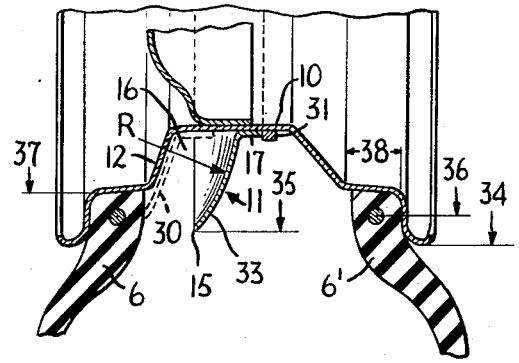
FIGS. 3 and 4 are radial sections of other embodiments in accordance with the invention but on a larger scale than FIGS. 1 and 2.

FIG. 3 shows a manner of positioning of the ring-shaped element 11, similar to that shown in the preceding figures, which has the advantage of facilitating the fitting of a tire on a rim in accordance with the invention. The base flange 17 of the annular element 11 is a cylindrical hoop that is assembled with a clearance on the rim base 10. Thus, the annular element 11 can slide axially and be first in position 30 near the conical hoop 12 when the inner bead 6' is mounted. Thereafter, it can be pushed back, when the outer bead 6 is fitted on, by the said bead proper until contact is made with a circular stop 31 integral with the rim bottom 10 whereby the assembly groove 16 is opened up permitting the insertion of the outer bead 6, so that from that moment on, it is in operating position in accordance with the invention.

The annular element 11 shown in FIG. 3 is obtained, for example, by means of a shaped metal plate band cut lengthwise and bent, the two ends of which are then joined by welding. In order to equip, for example, a standard rim measuring 4 ½ J 15, the hoop forming the base 17 carrying the projecting part 33 may have a diameter of 342 mm and 15 mm axial width. The projecting part is curved with a radius R of 35 mm. The supporting edge may have a diameter of 403 mm and may end in a rounded portion at 15 with a radius of 1.5 mm. The thickness of the metal plate used is 3 mm.

FIG. 3 also indicates the diameter 34 of the rim flange, the diameter 35 of the supporting edge 15, the mean diameter 36 of the bead wire, the diameter 37 and the axial width 38 of the seat of the bead on the rim.

Figure 4:
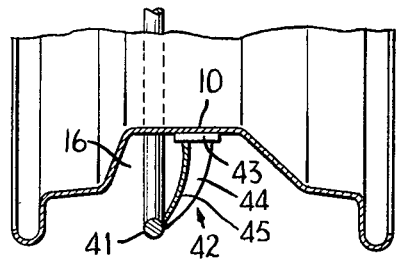

FIG. 4 represents another embodiment of the annular element in accordance with the invention, using, generally speaking, a shaped metal element showing in radial cross section a rounded supporting edge, for example, a wire, such as represented at 41 or also a steel tube. The wire 41 is maintained by supports, the cross section of which is shown at 42 and on the end of which it is attached. Each support is dimensioned in such a manner as to withstand without substantial deformation the thrust of the tire whenever it comes to bear and it is positioned on the bottom of the rim in such a manner as to provide the assembly groove 16 for the outer bead. Each support 42 can be given, for example, a T-shaped or L-shaped cross section, the web 44 of which is directed in the axial direction while the wing 45 (shown in cross section) of which runs in the direction of the circumference. The support designed in this manner can be attached by means of a terminal base 43 to the bottom of the rim 10.

The annular element 11 in accordance with the invention can be made more rigid by any convenient means, for example, by radial ridges stamped in or added. It may also be lightened in weight, for example, by means of perforations.

Generally, the annular element in accordance with the invention can be manufactured from all kinds of material and by any suitable method. Thus, one may use laminated steel, cast or extruded steel, light metal alloys, or hard plastomers or elastomers, possibly reinforced by metal cords or fibers or fiber glass or glass cords.

It may also be desirable to produce the annular element in the form of separate and removable sections so as to make it possible to take them out if one wishes to use the wheel with a tire having a tube.

The scope of the invention is not exceeded if a single-piece ring-shaped element is replaced by separate and removable sections. Of course, each of the protruding sections must be designed in such a manner as to resist axial thrusts that may be as high as the load carried by the tire mounted on the rim.

Furthermore, each section may be separated from the following one by a circumferential space of a length ranging from 15 to 30 percent of the diameter 37 of the bead seat, as indicated in FIG. 3

It is also possible within the framework of the present invention, in combination with the aforedescribed annular element and while maintaining the initial width of the rim, to reduce the axial width 38 (FIG. 3) of the outer bead seat, such as 13 in FIGS. 1 and 2. The magnitude of this reduction ranges from 15 to 30 percent of the customary width used for the mounting of a tubeless tire. This additional width, which in conventional wheels serves only to delay the loss of tightness, makes the rim heavy. It is possible to shorten the outer seat on the aforementioned 4 ½ J 15 rim in this manner by 5 millimeters, which represents a relative decrease of 25 percent.

Contrary to the known solutions for the prevention or delaying of unwedging of the bead, the ring-shaped supporting element provided on the rim and forming the subject of the invention makes it possible to diminish the radial grip and the manufacturing tolerances regarding the diameter of the beads of a tubeless tire. This results in appreciable savings on the cost of such tires.

Thus, there is provided in accordance with the invention a novel and highly effective wheel that is not only superior to conventional wheels for mounting tubeless tires but also quite economical. Many modifications of the representative embodiments disclosed herein will readily occur to those skilled in the art, and the invention is to be construed as including all the embodiments thereof within the scope of the appended claims.

I claim:

1. In a wheel for an automotive vehicle comprising a rim formed with a rim base and, on either side thereof, a bead seat ending in a rim flange, the improvement comprising an annular element surrounding and upstanding from said rim base and having a diameter at least as great as the diameter of the bead seat and no greater than the diameter of the rim flange, said annular element extending axially as well as radially from its point of attachment to said rim base and being positioned to engage and support the outer bead of a tubeless tire when the tire is deformed as in high-speed cornering, whereby unwedging of the outer bead and consequent loss of inflation air are prevented, and being positioned in spaced-apart relation to said bead when the tire assumes its normal form.

2. A wheel according to claim 1 wherein said annular element has a diameter greater than the diameter of the bead seat and the portion of the annular element that extends radially beyond the bead seat is roughly parallel to the rim flange.

3. A wheel according to claim 1 wherein said rim is of well base construction.

4. A wheel according to claim 3 wherein said outer bead is formed with a circumferential reinforcement and the radially outer edge of said annular element has a diameter greater than the diameter of said bead reinforcement so that, when said annular element engages said outer bead as in high-speed cornering, it does so at points of the tire which are more remote from the tire axis than is said circumferential reinforcement.

5. A wheel according to claim 3 wherein said annular element is separated axially from the outer lateral wall of said well base a distance sufficient to permit insertion between said annular element and said lateral wall of a bead of said tire during mounting of said tire on said rim.

6. A wheel according to claim 5 wherein the mounting of said annular element on said rim base is such that said annular element is slidable axially between two positions, one of said positions facilitating mounting of said tire on said rim.

* * * * *